United States Patent Office 3,164,626
Patented Jan. 5, 1965

3,164,626
CATALYTIC PRODUCTION OF ACRYLONITRILE FROM A GASEOUS MIXTURE CONTAINING PROPYLENE
Saburo Minekawa, Shohei Hoshino, Atsushi Shibata, and Naoya Kominami, all of Tokyo, Japan, assignors to Asahi Kasei Kogyo Kabushiki Kaisha, Osaka, Japan, a corporation of Japan
No Drawing. Filed Mar. 22, 1960, Ser. No. 16,662
Claims priority, application Japan, Apr. 21, 1959, 34/12,876; Feb. 6, 1960, 35/3,669
13 Claims. (Cl. 260—465.3)

This invention relates to the production of acrylonitrile. In the particular aspects, this invention relates to a process for the production of acrylonitrile directly from propylene, ammonia and molecular oxygen by the gas phase catalytic reaction therebetween in the presence of a catalyst specified hereinafter.

In order to produce acrylonitrile directly from propylene and ammonia and molecular oxygen by the gas phase catalytic reaction therebetween several attempts have been made heretofore. In these prior attempts, however, only acetonitrile or propionitrile could be obtained, whereas acrylonitrile could not be obtained or obtained only in very low yields or in trace amounts. In the prior art, accordingly, acrylonitrile must be produced stepwise through suitable intermediates such as acrolein, allyl amine, etc. As a result of our extensive studies in the above stepwise reactions we have now found that acrylonitrile may be produced preferentially with a good yield by carrying out the catalytic reaction of a mixed gas consisting of propylene and ammonia and molecular oxygen at an elevated temperature and in the presence of a catalyst specified hereinafter.

Accordingly, the main object of the invention based on the above finding is to provide a new, simplified and economical process for the production of acrylonitrile. Other objects, features, characteristics and advantages comprehended by this invention will be apparent from the description and claims which follow.

Suitable catalysts which may be used for carrying out the instant process are mixtures of tellurium oxide and molybdenum oxide or phospho-molybdic acid. The catalysts mentioned supra may contain vanadium pentoxide, nickel oxide or tin oxide if necessary. The ratio between these metallic components may vary within a wide range without substantial decrease of catalytic activity. But when tellurium and molybdenum compounds are combined, a weight ratio between Te and Mo of 1:0.5–2.0, calculated as pure metallic element is preferred, and when vanadium pentoxide, nickel oxide or tin oxide is combined with tellurium oxide, the weight ratio of vanadium, nickel or tin, as pure metal, is preferably 0.3–1.0, 0.2–1.0, or 0.5–2.0 respectively to 1 part of tellurium.

In addition, not more than 0.1% by weight, based on the total weight of the catalyst, of alkali halide, e.g. NaCl, KCl, LiCl, may be added to the aforementioned catalytically active components thereby effentively suppressing the by-production of carbon dioxide. Furthermore, the catalytically active components may be used with or without other suitable substances including carrier materials. Suitable carriers which may be mentioned are various types of silicic compounds such as silica, pumice, diatomaceous earth, clay, bauxite, kaolin, bentonite, etc. or alumina. From an economical point of view and for convenience in the control of catalyst activity, the carrier materials may be used in amounts of from 50 to 90% by weight, based on the total catalyst weight. In the instant process, when a carrier material is used, the pretreatment of said material is very important. For example, whether the carrier material has been pretreated at a temperature above 1000° C. or not is closely related to the efficiency of the catalytic reaction in the process of this invention. Such a relationship will be especially noticeable when the carrier material is a natural substance such as kaolin.

The composition of the reaction gas used for the production of acrylonitrile herein may vary within a wide range. Usually, however, approximately 10% of the propylene concentration is preferable. The molar ratio of ammonia to propylene may be 1.0–2.0. If the amount of ammonia used exceeds said ratio there is no improvement in yield, and therefore it is economically disadvantageous to use a greater amount of ammonia. Also, as in the commonly known gas phase oxidation, a diluent which may be inactive under reaction condition, such as steam, air, nitrogen, propane, etc. may be added to the reaction gas mixture. In carrying out the invention, the reaction temperature may be from 300° to 480° C. and more preferably from 330° to 450° C. The time during which a catalyst is contacted with the reaction gas mixture may be from 0.1 to 20 seconds and preferably less than 10 seconds.

The following examples will show how the invention may be carried out, but the invention is not to be construed as limited thereto.

In the following examples:

(1) The composition of a catalyst is expressed by weight.
(2) The composition of the mixed gas used is expressed by volume.
(3)

$$\text{The percent conversion} = \frac{\text{mole of product}}{\text{mole of propylene fed}} \times 100$$

excepting for $CO_2$ and HCN $$\text{Percent conversion} = \frac{\frac{1}{3}(\text{mole of product})}{\text{mole of propylene fed}} \times 100$$

(4)

$$\text{The yield} = \frac{\text{mole of product}}{\text{totle mole of propylene comsumed}} \times 100$$

excepting for $CO_2$ and HCN $$\text{yield} = \frac{\frac{1}{3}(\text{mole of product})}{\text{mole of propylene fed}} \times 100$$

EXAMPLE 1

Powdered molybdenum trioxide, vanadium pentoxide and tellurium oxide were mixed at the weight ratio of 20 parts, 10 parts and 10 parts respectively. The mixture was mixed with 60 parts of kaolin which was calcined at 1000° C. for 10 hours, and then kneaded together with water to form paste. The paste was formed to granules of 6–10 mesh and then calcined at 400° C. for 4 hours in an air stream thereby to have a mass as catalyst. Twenty milliliters of the thus obtained catalyst were packed in a hard glass reaction tube having an interior diameter of 16 mm. The temperature in the reaction tube was maintained at 400° C. (by indirect controlling) by means of a niter bath. A previously mixed gas having 8.4% of propylene, 8.4% of ammonia and 83.2% of air entered into the reaction tube at a flow rate of 133 cc./min. When the reaction was completed, a sample was recovered and analyzed. For the analysis of the produced gas, gas chromatography was mainly used. The result is shown in Table 1.

*Table 1*

|  | Conversion, percent | Yield on the consumed propyrene basis, percent |
|---|---|---|
| Acrylonitrile | 25.0 | 58.6 |
| Acetonitrile | 2.4 | 5.6 |
| Carbon dioxide | 5.0 | 11.7 |
| Hydrogen cyanide | 1.8 | 4.2 |
| Others | 8.5 | 19.9 |

EXAMPLES 2–4

Fifty-five parts by weight of kaolin, previously pretreated at 1000° C., 20 parts of ammonium phosphomolybdate, 15 parts of vanadium pentoxide and 10 parts of tellurium oxide were mixed thoroughly and then the mixture was kneaded with water to form a paste, which was then formed to granules of 6–10 mesh and thereafter calcined at 400° C. for 6 hours. Twenty milliliters of the thus obtained catalyst were packed in a reaction tube (16 mm. $\phi$). A mixed gas having a specified propylene concentration was introduced into said reaction tube. The experimental results are set forth in Table 2.

*Table 2*

|  | Example 2 | Example 3 | Example 4 |
|---|---|---|---|
| Propyrene conc. (percent)/Ammonia conc. (percent) | 3.0/3.0 | 5.0/5.0 | 8.0/8.0 |
| Niter bath temperature, ° C | 400 | 400 | 400 |
| Reaction gas feed rate, cc./min | 133 | 133 | 133 |
| Conversion, (percent): |  |  |  |
| Acrylonitrile | 8.0 | 18.5 | 21.3 |
| Acetonitrile | 0 | 1.5 | 1.7 |
| Carbon dioxide | 20.0 | 13.5 | 10.0 |
| Hydrogen cyanide | 5.0 | 1.5 | 1.3 |
| Others | 10.7 | 8.6 | 7.0 |

EXAMPLE 5

Seventy parts of kaolin previously calcined at 1000° C. for 10 hours, 20 parts of ammonium phospho-molybdate, 10 parts of tellurium oxide and 1 part of sodium chloride were well mixed and the mixture was kneaded with water to form a paste. This was formed into granules of 6–10 mesh and dried, and thereafter calcined at 400° C. for 4 hours. Twenty milliliters of the thus obtained catalyst was packed in a reaction tube with the interior diameter of 16 mm. Into the reaction tube maintained at 390° C. a previously mixed gas containing 8.2% of propylene, 8.5% of ammonia and 83.3% of air was introduced into the reaction tube at a flow rate of 133 cc./min. When the reaction was complete, the produced gas was analyzed. The analytical result is shown in Table 3 below.

*Table 3*

|  | Conversion, percent | Yield on the consumed propylene basis, percent |
|---|---|---|
| Acrylonitrile | 15.0 | 58.8 |
| Acetonitrile | 3.0 | 11.8 |
| Carbon dioxide | 2.0 | 7.9 |
| Hydrogen cyanide | 0.5 | 2.0 |
| Others | 5.0 | 19.6 |

EXAMPLES 6–8

One hundred and seventy-five parts of aqueous colloidal silica sol ($SiO_2$ content 40% by weight) were mixed with 20 parts of ammonium phospho-molybdate and 10 parts of tellurium oxide, both having been powdered to a size of 200–300 mesh. Then the mixture was kneaded for a long time to form a paste, which was followed by drying and reducing to granules of 6–10 mesh. The mass was then calcined at 400° C. for 4 hours while air was passed through. Twenty milliliters of the thus obtained catalyst was packed in a reaction tube (16 mm. $\phi$), into which a mixed gas containing 5.1% of propyrene, 6.0% of ammonia and 88.9% of air was introduced at a flow rate of 133 cc./min. The reaction was carried out at a specified temperature. The results are shown in Table 4 below.

*Table 4*

|  | Example 6 | Example 7 | Example 8 |
|---|---|---|---|
| Reaction temperature, ° C | 380 | 400 | 410 |
| Conversion (Percent): |  |  |  |
| Acrylonitrile | 42.3 | 38.0 | 37.5 |
| Acetonitrile | 5.5 | 4.8 | 5.2 |
| Acrolein | 6.0 | 13.1 | 13.8 |
| Acetaldehyde | | | |
| Carbon dioxide | 11.3 | 12.5 | 15.0 |
| Hydrogen cyanide | 3.5 | 1.5 | 0.7 |
| Unreacted propylene | 31.8 | 30.1 | 27.7 |
| Yield on the consumed propyrene basis (percent): |  |  |  |
| Acrylonitrile | 62.0 | 54.3 | 51.9 |
| Acetonitrile | 8.1 | 6.9 | 7.2 |
| Acrolein | 8.8 | 18.7 | 19.1 |
| Acetaldehyde | | | |
| Carbon dioxide | 16.1 | 17.9 | 20.8 |
| Hydrogen cyanide | 5.1 | 2.1 | 1.0 |

EXAMPLE 9

A reaction was carried out at 400° C., using the same catalyst as in Examples 6 to 8 and a mixed gas containing 7.7% propylene, 7.4% ammonia and 84.9% air. Other reaction conditions were defined as in the foregoing examples. The result is shown in Table 5.

*Table 5*

| | Conversion, percent |
|---|---|
| Acrylonitrile | 35.9 |
| Acetonitrile | 5.0 |
| Acrolein | 12.0 |
| Carbon dioxide | 20.0 |
| Hydrogen cyanide | 0.2 |
| Others | 5.2 |

EXAMPLE 10

One hundred seventy parts of aqueous colloidal silica sol ($SiO_2$ content 40% by weight) prepared in the usual manner were mixed and kneaded with 20 parts of molybdenum oxide and 10 parts of tellurium oxide, both having been powdered to 200–300 mesh, to form a pasty mass, which, after drying, was reduced to granules of 6–10 mesh and then calcined at 400° C. for 4 hours by a stream of air. Twenty milliliters of the thus obtained catalyst was packed in a reaction tube which was immersed in a niter bath at 400° C. Into the reaction tube a mixed gas containing 8.0% propylene, 8.3% ammonia and 83.7% air was introduced at a flow rate of 133 cc./min. The produced gas was recovered at certain intervals and analyzed. Percent conversion based on the propylene feed is seen in Table 6.

*Table 6*

| | Conversion, percent |
|---|---|
| Acrylonitrile | 30.0 |
| Acetonitrile | 5.0 |
| Acrolein | 10.0 |
| Carbon dioxide | 30.0 |
| Hydrogen cyanide | 0.3 |
| Others | 6.0 |

EXAMPLE 11

Sixty parts of kaolin, previously pretreated at 1000° C., 20 parts of ammonium phospho-molybdate, 10 parts of nickel oxide and 10 parts of tellurium oxide were thoroughly mixed and the mixture kneaded with water for a long time. The mass was reduced to granules of 6–10 mesh and dried and calcined at 400° C. for 4 hours in an air stream. Twenty milliliters of the resultant catalyst was packed in a reaction tube, which was maintained at 400° C. and into the reaction tube a mixed gas containing 5.0% of propylene, 5.1% of ammonia and 89.9% of air was introduced at a flow rate of 133 cc./min. The analytical result of the produced gas is shown in Table 7.

Table 7

|  | Conversion, percent | Yield on the consumed propylene basis, percent |
|---|---|---|
| Acrylonitrile | 12.5 | 43.3 |
| Acetonitrile | 0 | 0 |
| Carbon dioxide | 6.0 | 20.8 |
| Hydrogen cyanide | 0.3 | 10.4 |
| Others | 10.0 | 34.7 |

EXAMPLE 12

The same procedures as in Example 11 were followed, excepting that molybdenum oxide was used instead of the ammonium phospho-molybdate of Example 11. Substantially the same results were obtained.

EXAMPLES 13–15

Sixty parts of kaolin pretreated at 1000° C., 20 parts of ammonium phospho-molybdate, 10 parts of tin dioxide and 10 parts of tellurium oxide were thoroughly mixed, and the mixture kneaded with water. The resultant mass was reduced to granules of 6–10 mesh and calcined at 400° C. for 4 hours. Twenty milliliters of the thus obtained catalyst was packed in a 16 mm. $\phi$ reaction tube, which was immersed in a niter bath. Then a mixed gas containing 7.7% of propylene, 7.4% of ammonia and 84.9% of air was introduced into the reaction tube at a flow rate of 133 cc./min. The reactions were carried out at the temperatures specified in Table 8, which also shows the analytical result of the produced gases.

Table 8

|  | Example 13 | Example 14 | Example 15 |
|---|---|---|---|
| Niter bath temperature, ° C. | 350 | 370 | 400 |
| Conversion, (percent): |  |  |  |
| Acetaldehyde | 0.6 | 1.0 | 1.0 |
| Acrolein | 0 | 0.6 | 22.0 |
| Acetonitrile | 1.2 | 1.3 | 0.6 |
| Acrylonitrile | 15.0 | 23.5 | 16.0 |
| Carbon dioxide | 3.0 | 5.1 | 8.0 |
| Hydrogen cyanide | 1.0 | 0.8 | 0.1 |
| Others | 7.0 | 9.4 | 15.0 |

EXAMPLES 16–21

One hundred and fifty parts of aqueous colloidal silica sol ($SiO_2$ content 40% by weight) were mixed with 20 parts of a 200–300 mesh powdered ammonium phospho-molybdate and 10 parts of a 200–300 mesh powdered tellurium oxide and 10 parts of a 200–300 mesh powdered tin dioxide, and the mixture was kneaded for a long time to form a pasty mass. After drying, the mass was reduced to granules of 6–10 mesh and then calcined at 400° C. for 4 hours by a stream of air. Twenty milliliters of the catalyst was packed in a reaction tube. A flow rate of the mixed gas was 133 cc./min. Effects of the composition of the mixed gas used and the reaction temperature were investigated. These results are tabulated in Tables 9 and 10.

Table 9

EFFECT OF REACTION TEMPERATURE

|  | Example 16 | Example 17 | Example 18 |
|---|---|---|---|
| A mixed gas composition $C_3H_6$ percent/$NH_3$ percent | 7.2/8.6 | 7.2/8.6 | 7.2/8.6 |
| Reaction temperature, ° C. | 380 | 400 | 410 |
| Conversion (percent): |  |  |  |
| Acrylonitrile | 49.0 | 45.0 | 43.7 |
| Acetonitrile | 4.0 | 5.6 | 5.8 |
| Acrolein | 6.0 | 7.0 | 7.7 |
| Acetaldehyde |  |  |  |
| Carbon dioxide | 10.2 | 10.0 | 15.0 |
| Hydrogen cyanide | 1.4 | 1.2 | 0.8 |
| Yield on the consumed propylene basis (percent): |  |  |  |
| Acrylonitrile | 69.4 | 65.4 | 59.9 |
| Acetonitrile | 5.7 | 8.1 | 7.9 |
| Acrolein | 8.5 | 10.2 | 10.6 |
| Acetaldehyde |  |  |  |
| Carbon dioxide | 14.5 | 14.5 | 20.6 |
| Hydrogen cyanide | 2.0 | 1.8 | 1.1 |

Table 10

EFFECT OF THE COMPOSITION OF THE MIXED GAS USED

|  | Example 19 | Example 20 | Example 21 |
|---|---|---|---|
| A mixed gas composition $C_3H_6$ percent/$NH_3$ percent | 5.1/6.0 | 7.2/8.6 | 8.8/11.0 |
| Reaction temperature, ° C. | 410 | 410 | 410 |
| Conversions (percent): |  |  |  |
| Acrylonitrile | 35.0 | 43.7 | 42.0 |
| Acetonitrile | 3.6 | 5.8 | 8.0 |
| Acrolein | 12.0 | 7.7 | 0.0 |
| Acetaldehyde |  |  |  |
| Carbon dioxide | 13.0 | 15.0 | 13.0 |
| Hydrogen cyanide | 1.2 | 0.8 | 1.2 |
| Yields on the consumed propylene basis (percent): |  |  |  |
| Acrylonitrile | 54.0 | 59.9 | 64.4 |
| Acetonitrile | 5.6 | 7.9 | 12.3 |
| Acrolein | 18.5 | 10.6 | 0.0 |
| Acetaldehyde |  |  |  |
| Carbon dioxide | 20.0 | 20.6 | 2.0 |
| Hydrogen cyanide | 1.9 | 1.1 | 1.9 |

EXAMPLE 22

When the ammonium phospho-molybdate in any of Examples 13–21 was replaced by molybdenum tri-oxide, the result obtained was substantially the same as that of the corresponding examples.

What we claim is:

1. A process for direct production of acrylonitrile from propylene which consists essentially of contacting at a temperature of from 300° to 480° C. (a) a gaseous admixture of propylene, ammonia and molecular oxygen with (b) oxidizing catalyst, the oxidizing catalyst being a member selected from the group consisting of binary mixture of tellurium oxide:molybdenum oxide, binary mixture of tellurium oxide:phospho-molybdic acid, ternary mixture of tellurium oxide:phospho-molybdic acid:vanadium oxide, ternary mixture of tellurium oxide:phospho-molybdic acid:stannic oxide, ternary mixture of tellurium oxide:phospho-molybdic acid:nickel oxide, ternary mixture of tellurium oxide:molybdenum oxide:vanadium pentoxide and ternary mixture of tellurium oxide-molybdenum oxide:nickel oxide.

2. A process for the direct production of acrylonitrile, which comprises (1) admixing propylene, ammonia and molecular oxygen as gases and (2) contacting said admixture at a temperature of from 300° to 480° C. with catalyst consisting essentially of tellurium oxide and phospho-molybdic acid at a tellurium:molybdenum weight ratio between 1:0.5 and 1:2.0 and being charged on 50 to 90% by weight, based on the total catalyst weight, of a silicic carrier material.

3. A process for the direct production of acrylonitrile from propylene, ammonia and molecular oxygen which comprises (1) admixing propylene, ammonia and molecular oxygen as gases and (2) contacting said admixture at a temperature of from 300° to 480° C. with catalyst consisting essentially of tellurium oxide and molybdenum oxide at a tellurium:molybdenum weight ratio between 1:0.5 and 1:2.0 and being charged on 50 to 90% by weight, based on the total catalyst weight, of a silicic carrier material.

4. A process according to claim 2 wherein said contacting with catalyst is effected for a period of from 0.1 to 20 seconds.

5. A process as claimed in claim 2, wherein said carrier material is selected from the group consisting of silica gel and kaolin.

6. A process according to claim 2 wherein said gaseous mixture contains as diluent an inert gas selected from the group consisting of steam, nitrogen and gaseous lower paraffins.

7. A process acocrding to claim 3 wherein said contacting with catalyst is effected for a period of from 0.1 to 20 seconds.

8. A process as claimed in claim 3, wherein said carrier material is selected from the group consisting of silica gel and kaolin.

9. A process according to claim 3 wherein said gaseous mixture contains as diluent as inert gas selected from the group consisting of steam, nitrogen and gaseous lower paraffins.

10. In the catalytic production of acrylonitrile at an elevated temperature from a gaseous mixture containing propylene, ammonia and molecular oxygen, the feature wherein the catalyst is the combination of tellurium oxide, phospho-molybdic acid and vanadium pentoxide, the tellurium:molybdenum:vanadium weight ratio being within the range 1:0.5 to 2.0:0.3 to 1.0, whereby the acrylonitrile is produced directly from the gaseous mixture.

11. In the catalytic production of acrylonitrile at an elevated temperature from a gaseous mixture containing propylene, ammonia and molecular oxygen, the feature wherein the catalyst is the combination of tellurium oxide, molybdenum oxide and vanadium pentoxide, the tellurium:molybdenum:vanadium weight ratio being within the range 1:0.5 to 2.0:0.3 to 1.0, whereby the acrylonitrile is produced directly from the gaseous mixture.

12. In the catalytic production of acrylonitrile at an elevated temperature from a gaseous mixture containing propylene, ammonia and molecular oxygen, the feature wherein the catalyst is the combination of tellurium oxide, phospho-molybdic acid and nickel oxide, the tellurium:molybdenum:nickel weight ratio being within the range 1:0.5 to 2.0:0.2 to 1.0, whereby the acrylonitrile is produced directly from the gaseous mixture.

13. In the catalytic production of acrylonitrile at an elevated temperature from a gaseous mixture containing propylene, ammonia and molecular oxygen, the feature wherein the catalyst is the combination of tellurium oxide, molybdenum oxide and nickel oxide, the tellurium:molybdenum:nickel weight ratio being within the range 1:0.5 to 2.0:0.2 to 1.0, whereby the acrylonitrile is produced directly from the gaseous mixture.

References Cited in the file of this patent

UNITED STATES PATENTS

| | | |
|---|---|---|
| 2,481,826 | Cosby | Sept. 13, 1949 |
| 2,904,580 | Idol | Sept. 15, 1959 |
| 3,009,943 | Hadley et al. | Nov. 21, 1961 |